(12) United States Patent
Schwartzman

(10) Patent No.: US 7,396,164 B1
(45) Date of Patent: Jul. 8, 2008

(54) COMPENSATED ORIFICE FOR USE IN HYDROSTATIC FLUID BEARING

(76) Inventor: Everett H. Schwartzman, 2535 232nd St., Torrance, CA (US) 90505

(*) Notice: Subject to any disclaimer, the term of this patent is extended or adjusted under 35 U.S.C. 154(b) by 687 days.

(21) Appl. No.: 10/938,027

(22) Filed: Sep. 10, 2004

Related U.S. Application Data

(60) Provisional application No. 60/501,898, filed on Sep. 10, 2003.

(51) Int. Cl.
*F16C 32/06* (2006.01)

(52) U.S. Cl. .................... 384/100; 384/107; 384/110

(58) Field of Classification Search ............. 384/100, 384/110
See application file for complete search history.

(56) References Cited

U.S. PATENT DOCUMENTS

| 3,186,774 | A | * | 6/1965 | Wilcox | .................. | 384/12 |
| 3,606,501 | A | * | 9/1971 | Waplington | ............ | 384/110 |
| 4,828,403 | A | * | 5/1989 | Schwartzman | ......... | 384/100 |
| 4,919,547 | A |   | 4/1990 | Schwartzman | | |

2004/0247211 A1 * 12/2004 Hamke .................. 384/100

FOREIGN PATENT DOCUMENTS

JP          55126118 A   *  9/1980

* cited by examiner

*Primary Examiner*—Thomas R. Hannon
(74) *Attorney, Agent, or Firm*—Fulbright & Jaworski L.L.P.

(57) ABSTRACT

A hydrostatic bearing design employing inherently compensated orifices whose geometric design is such that the use of multiple orifices is substantially simplified. In normal cylindrical hydrostatic bearings, the orifices are usually employed in rows. There can be from three to 120 orifices per row, and usually from one to six rows in most designs. In these designs, the orifice is usually a separate component, which is pressed into the surface that constitutes the bearing. Inherently compensated orifices are comprised of three sections, i.e. the entrance section, the restricting orifice section, and the exit section. The first two of these sections are of circular cross section. This design employs slots versus cylindrical type of construction, thereby giving square or rectangular cross sections. The manufacturing of this type of hydrostatic bearing is greatly simplified since only three or slightly more parts are required, versus a separate part for each orifice. Various details are described with respect to the various structures illustrated. This design can be used not only with the typical cylindrical type bearing, but also can be utilized in flat and conical bearing geometries.

21 Claims, 5 Drawing Sheets

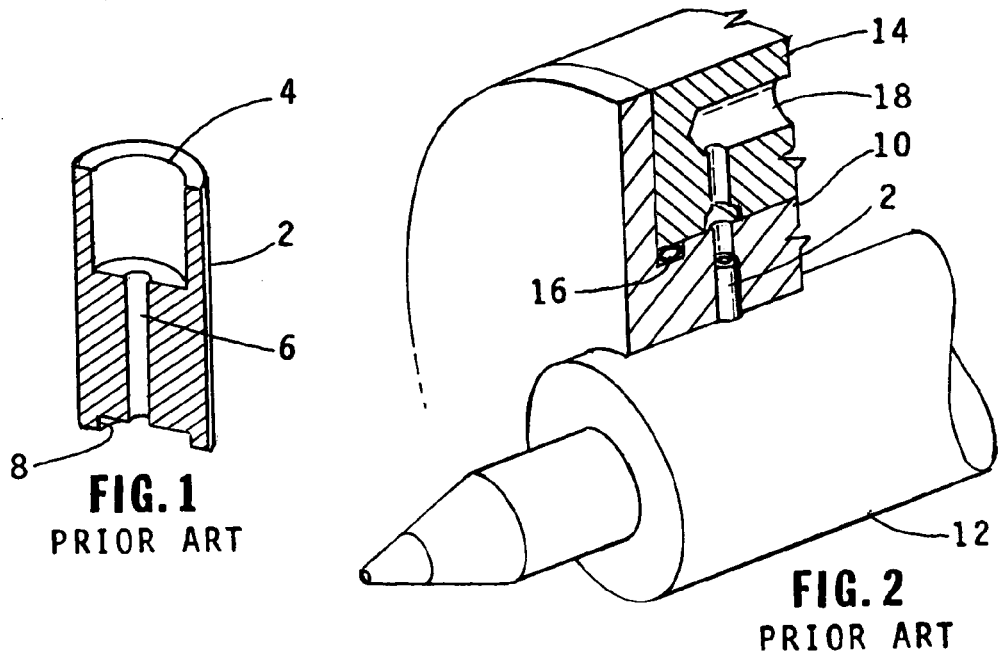
FIG. 1
PRIOR ART
FIG. 2
PRIOR ART
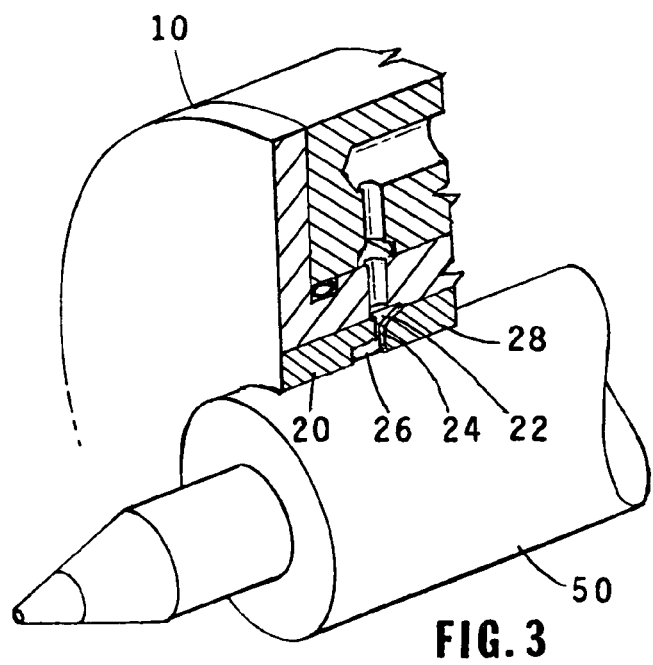
FIG. 3

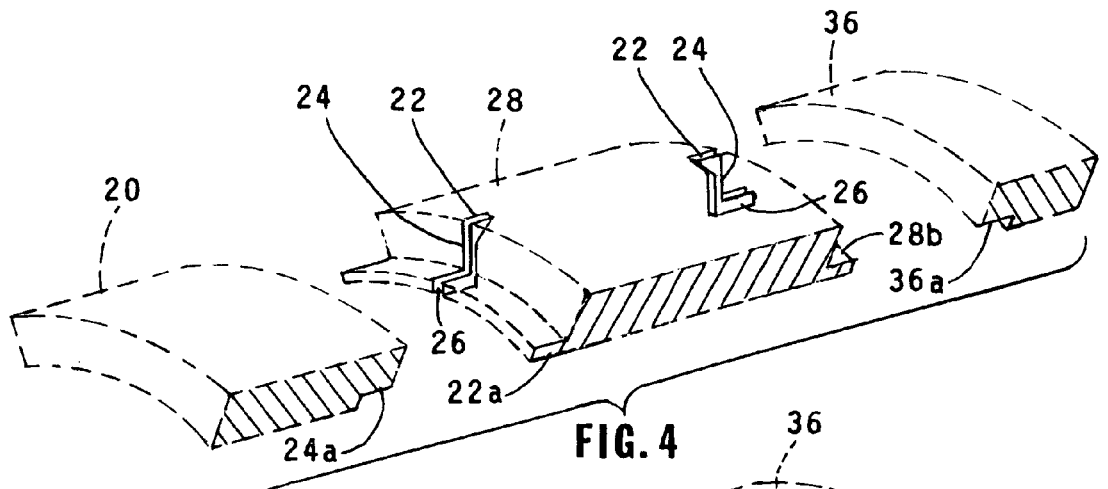
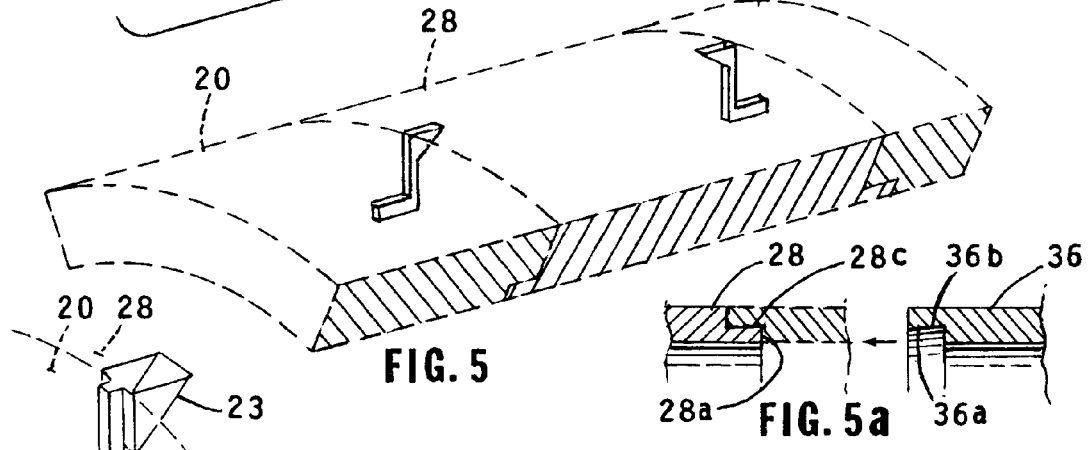
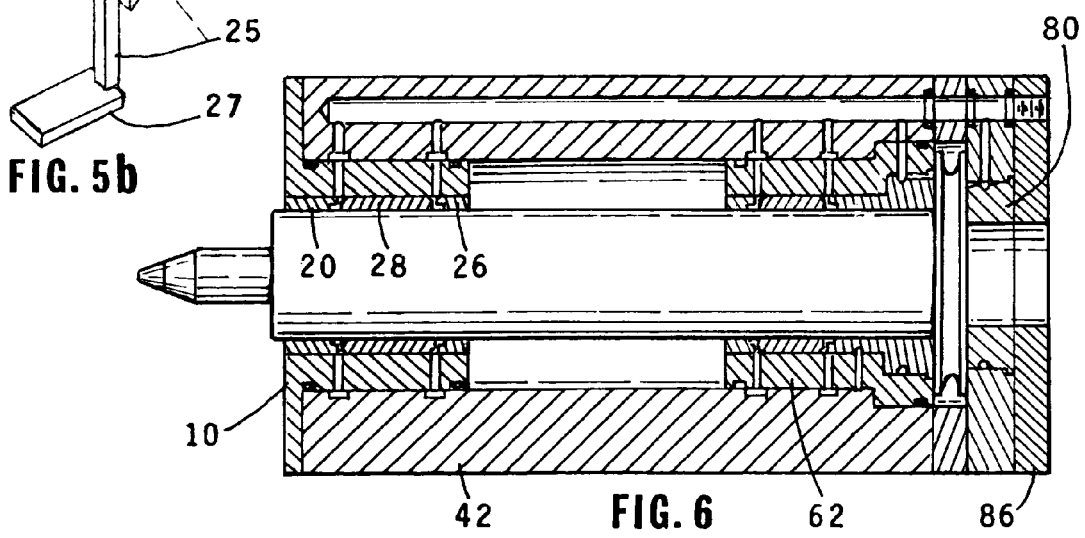

COMPENSATED ORIFICE FOR USE IN HYDROSTATIC FLUID BEARING

This application enjoys the priority of the provisional filing application No. 60/501,898, filing date Sep. 10, 2003.

FIELD OF THE INVENTION

The present invention relates to a fluid bearing assembly and more particularly to an improved and relatively simple orifice configuration. The orifice section utilized in the general design of hydrostatic bearings, are normally referred to as a jet with a circular pocket. They are also known as "recessed" jets (Robinson, C. H. and Sterry F., "*The static strength of pressure fed gas journal bearings, jet bearings.*" A.E.R.E. Rep. R/R 2642, Sep. 1958). Some characteristics of this type of bearing are also given in Richardson, H. H. "Static and dynamic characteristics of compensated gas bearings." M.I.T, Cambridge, Mass. April (1957) *Trans. Amer. Soc. Mech. Engrs.* 80, No. 7 (1958) 1503. With reference to the plain jet, and jet with a pocket, the flow through the plain jet is restricted by an "annular orifice," and the bearing is affected by this annular orifice compensation. The term "plain jet" is here preferred because it describes the geometry or construction rather than the aerodynamic function. Another type of feed hole is a capillary in which the pressure loss is due to viscous forces and not, as in the case of the jets, due to the loss of dynamic head.

BACKGROUND OF THE PRIOR ART

This type of bearing essentially is comprised of three specific types of zones constituting its geometry. The first zone would be the entrance portion to the orifice. The second zone is the restriction, which can be either a very small orifice in which the fluid control is by its diameter, or a capillary (small tube in which the fluid control is by its diameter and length). The third zone is the exit portion from the orifice. In a plain type bearing, this zone does not exist. In most bearing designs, this zone consists of a very thin disc shape.

The manner in which hydrostatic bearings work is that as the shaft approaches the orifices, because it is somewhat restricted the flow, there will be a pressure increase between the orifice area and shaft. Likewise, 180 degrees from the just mentioned orifice, the shaft will move away from the corresponding orifice. This has the effect of allowing the fluid to flow more freely causing a decrease in pressure between the orifice and the said shaft. Thus a restoring force is created which tends to keep the shaft centered in its bearing. The minimum number of orifices required per circumference would obviously be three. Normally four to 32 orifices are utilized. Another consideration concerning the design of these hydrostatic bearing systems is pneumatic hammer or "water hammer" if a fluid is used. This phenomena is basically a vibration which is set up between the shaft and its bearing. One of the main causes of this unwanted vibration is due to the time necessary for the so-called fluid compensated bearing to restore the shaft to its initial position. The fluid in association with the orifices and spacing caused by the shaft movement, sets up the occurring restoring forces. However, there is a finite amount of time required for the fluid to reach an equilibrium depending on the shaft position in its bearing. This so-called "time constant" is what causes the abovementioned vibration instabilities. In order to prevent this, very small orifices are necessary, along with the corresponding geometry such as the previously mentioned exit zone.

In general, gas lubricated bearings are normally assumed to have a given spring constant and a small amount of inherent dampening due to viscous forces. This spring constant may be measured by plotting a force vs. displacement curve. The damping coefficient may be determined by ascertaining the decrease in amplitude as a function of time of the bearing system after it is subjected to an impact load.

However, gas bearings are different from more conventional bearings in the sense that there is a finite time lag between the initial application of a displacement force and the time required for the bearing to reach a steady state condition, i.e., new position. Upon extensive investigation of experimental evidence, it was noted that this time constant or time lag is difficult to measure because it is obscured by the bearings damping. This time constant can be calculated, and becomes larger if the pocket type bearing is not designed with this in mind. It can be shown by computer simulation that, in general, the longer the time constant (first-order lag), the more unstable the system becomes. This time lag is caused by the fact that a finite amount of time is required for the fluid to flow out of the bearing or into the bearing depending on the location of the shaft until a new pressure distribution has been reached. It is known that a pocket type bearing has a greater restoring force, i.e., the force tending to establish a balancing equilibrium condition.

BRIEF DESCRIPTION OF THE DRAWINGS

FIG. 1 is a sectional view of an "inherently compensated orifice" (ICD) insert using the typical cylindrical geometry of the prior art.

FIG. 2 is a sectional view of a rotating shaft and bearing showing the typical position of the above insert of the prior art.

FIG. 3 is a sectional view showing the slotted aperture of the invention used to lubricate a rotating shaft.

FIG. 4 is an isometric exploded view of components showing the slotted bearing geometry in a journal bearing configuration.

FIG. 5 is an assembled view of the above components.

FIG. 5A is a section showing the taper (shown greatly exaggerated), which allows the bearing parts to snap together.

FIG. 5B is a view showing different size slots used in forming the inherently compensated orifice.

FIG. 6 is a sectional view showing the complete installation of the inherently compensated slotted orifice geometry as applied to a typical spindle.

DETAILED DESCRIPTION OF THE INVENTION

Figure 7:
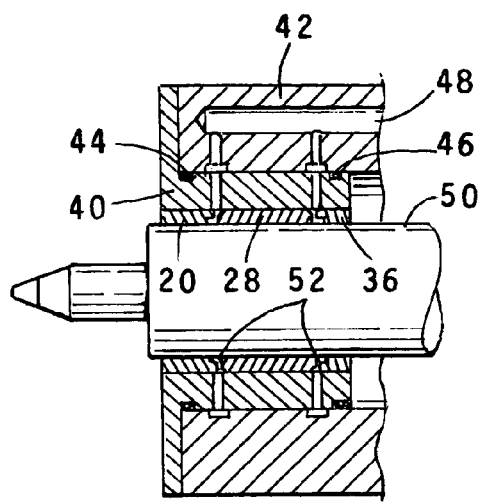
FIG. 7 is a sectional view of a rotating shaft supported in the radial direction by the inherently compensated slotted orifice geometry.

As required, a detailed illustrative embodiment of the invention is disclosed herein. The embodiment exemplifies the invention which may, of course, be embodied in other forms, some of which may be radically different from the illustrative embodiment as disclosed. However, the specific structural details disclosed herein are representative and they provide a basis for the claims which define the scope of the present invention.

Referring initially to FIG. 1, which shows a typical cylindrical insert, which in itself is the inherently compensated orifice. The outer housing 2 has three sections. 4 is the entrance volume. The orifice or capillary volume 6 basically controls the volume flow. The exiting volume 8 distributes the fluid such that a more effective bearing is obtained. It can be seen that the fluid from volume 4 flows through volume 6 and exits the orifice body via volume 8. Typical sizes usually employed are such that the cross sectional diameter of 4 is approximately 0.0625 inches. Cross sectional diameter of the orifice/capillary volume 6 is from 0.001 to 0.020 depending on the required specifications. The cross sectional diameter of volume 8 when using an orifice diameter of 0.005 inches is approximately 0.050 inches. The depth of volume 8 is typically from 0.0003 to 0.0009 inches.

Referring to FIG. 2, which shows the installation of the cylindrical inserts 2 in a typical bearing housing 10 supporting shaft 12. Said bearing housing 10 is installed in main housing 14, and sealed where necessary with O ring 16. Fluid is supplied by passage 18.

Referring to FIG. 3, which shows in detail the structure of the radial type inherently compensated orifice of the slotted design. Radial end piece 20 which contains the slotted orifice design comprising of entrance volume 22, orifice or capillary control volume 24 and exit volume 26. Radial end piece 20 is pressed into the radial center 28. This radial type bearing supports shaft 50 and contains one row of inherently compensated slotted orifice bearing. The geometry of the slotted orifice design is controlled by the path of the slotting saw during the manufacturing process.

Referring to FIG. 4, which shows the cylindrical components 20, 28, and 36 in an exploding view. Cylindrical section 28 contains the slotted orifice design comprising of entrance volume 22, orifice or capillary control volume 24 and exit volume 26. Annular groove 24a contained in part 20 accommodates protruding section 22a. Likewise, annular groove 36a in part 36 accommodates protruding cylindrical section 28b and snugly fits against cylindrical segment 28 so as to completely form the inherently compensated bearing structure in its radial form.

Referring to FIG. 5, the assembled view previously mentioned cylindrical end sections 20 and 36 assembled to center cylindrical section 28. There can be one or more rows and each row contains three or more slotted bearing orifices. This figure has two rows of slotted bearing orifices.

Referring to FIG. 5A, a cylindrical section 28 shows a slight tapered surface 28c on projection 28b. Likewise, accommodating annular groove contained in cylindrical section 36 has a slight taper on surface 36b. Upon assembly of cylindrical sections 36 and 28, they abut tightly together at surface 28a.

Referring to FIG. 5B, a view showing different size slots for different portions of the slotted inherently compensated orifice formed by cylindrical segments 20 and 28. This figure shows a large entrance volume 23, typical capillary section 25, and a wider exit volume 27 all produced by different width slotting saws and also by controlling the path of the slotting saw.

Referring to FIG. 6, a sectional view showing the installation of segments 20, 28, and 36 into bearing housing 10. Bearing housing 10 is installed into main housing 42. Likewise, rear bearing housing 62 is entrapped in main housing 42 by end cap 86. End cap 86 also entraps a slotted thrust type bearing 80.

Referring to FIG 7, which shows the installation of the segments 20, 28 and 36 into bearing housing 40. Bearing housing 40 is installed in main housing 42 and is sealed by O-rings 44 and 46. The fluid inlet 48 is in said housing 42. This assembly supports shaft 50 where each orifice 52 is shown. Said orifices 52 created by slotting, are distributed in radial rows. There can be one or more rows, and each row contains three or more orifices.

Figure 8:
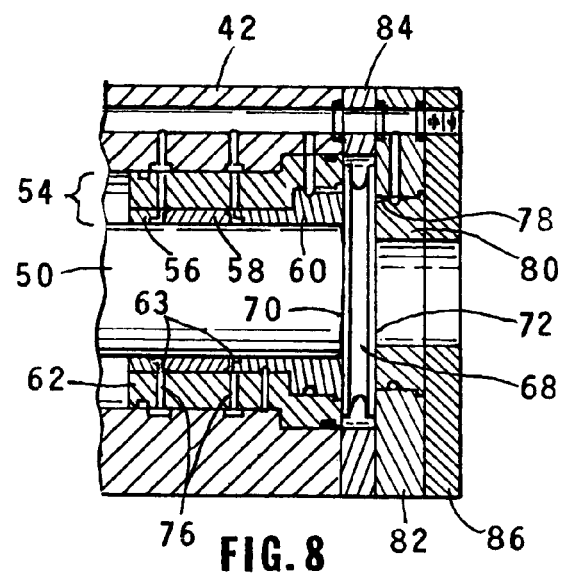
FIG. 8 is a sectional view showing the rotating member supported in both the radial and axial (thrust) positions by the application of the inherently compensated slotted orifice geometry.

Referring to FIG. 8, a sectional view showing the installation of both a radially supported and axial thrust supported shaft 50. A slotted radial and thrust bearing combination 54 is comprised of radial sections 56, 58, and 60, all contained in bearing housing 62. The radial inherently compensated bearing contained in housing 62 is described in FIG. 4. The slotted type inherently compensated orifice for maintaining axial thrust is contained in section 60, which is pressed into said housing 62. The rotating shaft member 50 as a thrust disc portion 68 which forms thrust bearing surfaces 70 and 72. The rear combination bearing 54 has radial inlet section 76 supplying radial orifices 63. Thrust maintained on surface 72 is obtained by radial slotted orifices 78 contained in thrust bearing housing 80 which is entrained in thrust housing 82 against thrust bearing spacer 84. Parts 84 and 82 are entrained by end cap 86 to main bearing housing 42.

Figure 9:
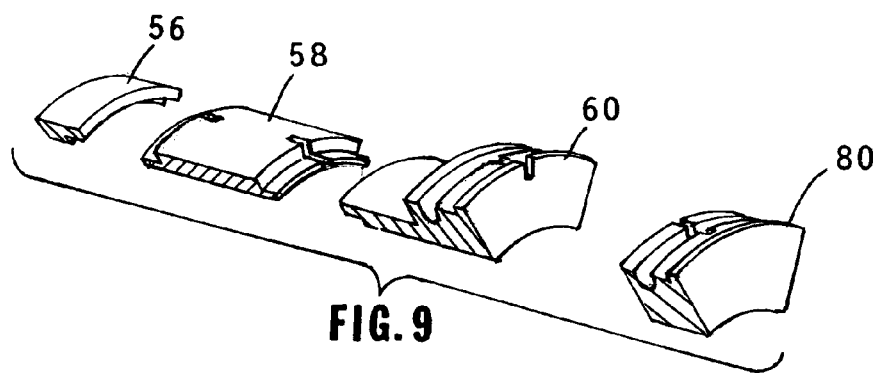
FIG. 9 is an isometric exploded view showing the details of bearing shown in FIG. 8.

Referring to FIG. 9, an exploded view showing the construction of both a radially supported and axial thrust bearing combination. Cylindrical components are respectively 56, 58, and 60. The slotted type inherently compensated orifice for maintaining axial thrust is also contained in cylindrical section 60, which is pressed into said housing 62, shown in FIG. 8. Bearing portion 80 is the slotted type inherently compensated orifice for maintaining axial thrust in the opposite direction of that just described in cylindrical section 60. Disc section 80 is contained in thrust housing 82 shown in FIG. 8.

Figure 10:
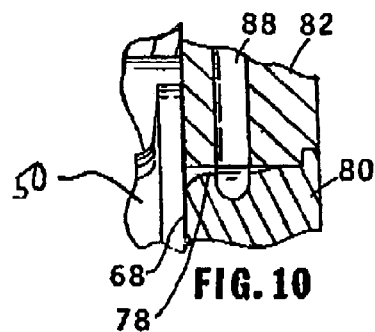
FIG. 10 is an enlarged detail of an inherently compensated slotted orifice using the novel slotted geometry for thrust bearing applications.

Referring to FIG. 10, a detail showing a sectional view of an inherently compensated orifice using the novel slotted geometry for thrust bearing applications. Bearing housing 80 is contained in thrust housing 82. Slotted orifice 78 is fed by gas inlet passage 88. Thrust bearing surface 68 is formed by a thrust bearing portion on the shaft 50 and housing member 82 and thrust bearing housing 80.

Figure 11:
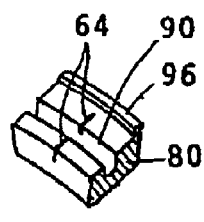
FIG. 11 is an isometric view of an inherently compensated orifice design of the slotted bearing described in this patent.

Referring to FIG. 11, another view of a portion of said thrust housing 80 showing a radial position of one inherently compensated slotted orifice 64. Radial groove 90 feeds said orifice 64. Annular retaining ridge 96 prevents any axial movement of structure 80 upon assembly.

Figure 12:
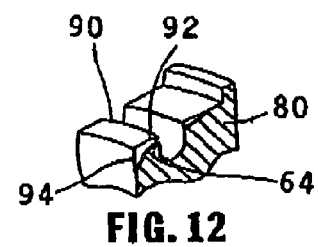
FIG. 12 is another enlarged detail of an inherently compensated orifice using the novel slotted geometry for thrust bearing applications showing the radial position of one such orifice.

Referring to FIG. 12, which shows a detail of a radial slotted orifice 84. Radial groove 90 is the inlet volume of said slotted orifice 64. Section 92 is the controlling orifice/capillary of said compensated orifice 64 and section 94 is exit volume of said orifice 64. This described structure is contained in said housing 80.

Figure 13:
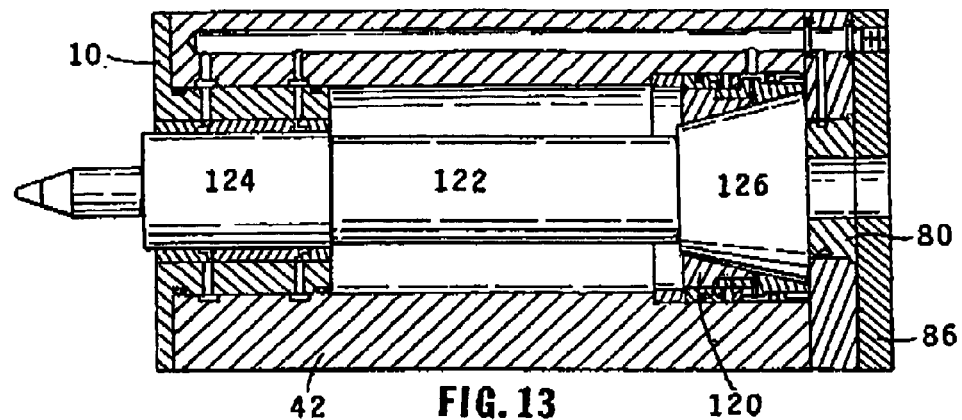
FIG. 13 is a cross-section view of a complete spindle assembly showing the details of the slotted orifice bearing concept in both the cylindrical, conical, and thrust plate formats.

Referring to FIG. 13, a sectional view showing the complete installation of the inherently compensated slotted orifice geometry contained in a typical spindle showing the details of the slotted orifice bearing concept in both the cylindrical portion 124 and conical portion 126 and thrust plate format, showing slotted thrust bearing 80. The main housing 42 contains front bearing assembly 10 and rear bearing assembly 120. Shaft 122 has a cylindrical front bearing portion 124 and a conical portion 126. The axial thrust is one direction for conical portion 126 is provided by the slotted inherently compensated orifices contained in part 120. Part 120 is described in detail in FIGS. 14, 15, 16, 17 and 18. The conical portion also supplies the radial restoring bearing forces. This design pertaining to the conical portion of the shaft 126 and outer bearing 120 is self-adjusting. This feature is covered by U. S. Pat. No. 4,919,547. Thrust in the opposite direction is provided by the slotted inherently compensated orifices contained in part 80. Part 80 is entrained by end cap 86 to main bearing housing 42.

Figure 14:
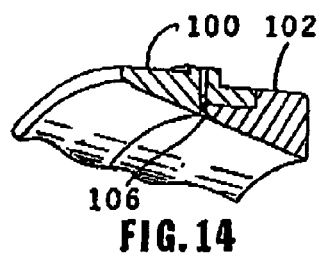
FIG. 14 is an isometric sectional drawing showing the complete assembly of the slotted orifice conical bearing.

Referring to FIG. 14, which shows the complete assembly of part 102 into part 100. Slotted inherently compensated orifice 106 is thus formed by parts 100 and 102.

Figure 15:
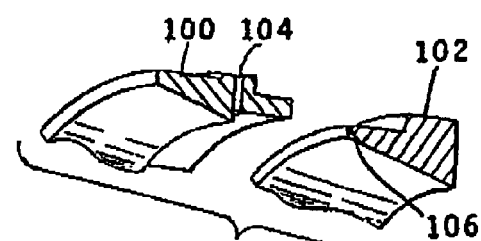
FIG. 15 is an isometric cutaway of a complete spindle assembly showing the details of the slotted orifice bearing concept in both the cylindrical, conical, and thrust plate formats.

Referring to FIG. 15, an isometric assembly of said parts 100 and 102. Feed hole 104 is shown as well as exit portion 106. The total assembly of said parts is designated as 120.

Figure 16:
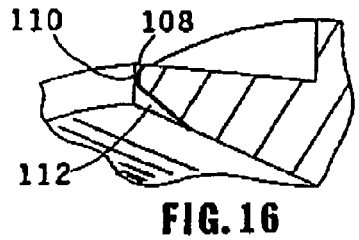
FIG. 16 is an isometric detail of the slotted orifice conical bearing showing the details of the slot geometry.

Referring to FIG. 16, which shows a detailed section of the slotted inherently compensated orifice 106. Section 108 is the inlet portion of said slotted inherently compensated orifice. Section 110 is the compensated orifice portion of the slotted inherently compensated orifice.

Figure 17:
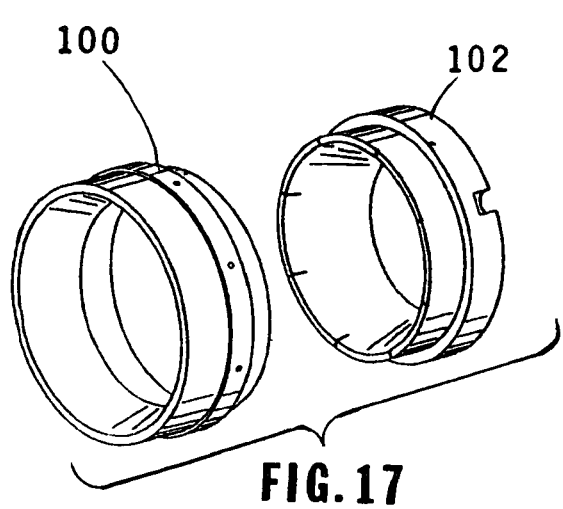
FIG. 17 is an isometric drawing showing the exploded assembly of the slotted orifice conical bearing.

Referring to FIG. 17, which shows an exploded isometric illustration showing parts 100 and 102.

Figure 18:
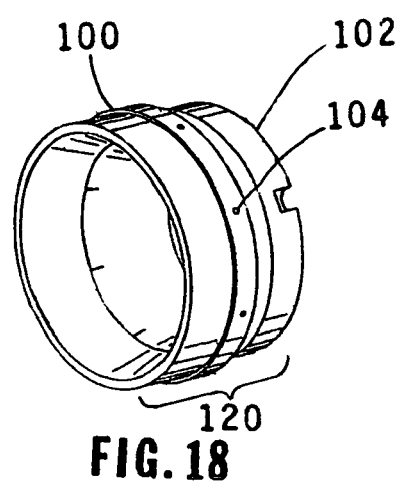
FIG. 18 is an isometric drawing showing the complete assembly of the slotted orifice conical bearing.

Referring to FIG. 18, an isometric assembly of said parts 100 and 102. Feed hole 104 is shown as well. The total assembly of said parts is designated as 120.

From the above description, a number of various structures has been described and it will become apparent to those skilled in the art that various modifications and alterations may be made by those skilled in the art in accordance with this disclosure without departing from the spirit and scope of the present invention as set forth in the amended claims.

What is claimed is:

1. A hydrostatic fluid bearing system comprising a housing containing radial and axial support means for a rotating shaft member, having provisions for a lubricating film there between, having a front and a rear cylindrical bearing including cylindrical segments for radial journal support, and having a thrust bearing to support shaft axial loads, lubricating fluid being directed to bearing surfaces through passages in said housing to orifices contained in said front and rear cylindrical bearings, said orifices being formed by at least two adjoining cylindrical segments, one of said cylindrical segments has an annular groove, the adjoining cylindrical segment has a projection which protrudes into said annular groove; said segment with said projection defining three or more radial slots forming slotted orifices for directing the lubricating fluid.

2. A hydrostatic fluid bearing system as defined in claim 1 wherein the thrust support bearing includes orifices which are formed by a cylindrical member having three or more axial slots, said cylindrical member having a mating member so as to form slotted inherently compensated orifices for introducing lubricating fluid for axial bearing surfaces and forces.

3. A hydrostatic fluid bearing system as defined in claim 1 wherein said annular groove defines a first surface and said projection defines a second surface, said first and second surfaces mate with each other and have slightly tapered surfaces so that upon assembly said segments abut tightly together to form said orifices.

4. A hydrostatic fluid bearing system as defined in claim 3 wherein said slotted orifices are comprised of three specific volume sections, the first volume being the inlet section, the second volume being the orifice section, the third volume being the exit section.

5. A hydrostatic fluid bearing system as defined in claim 1 wherein said slotted orifices define a substantially rectangular cross section.

6. A hydrostatic fluid bearing system comprising a housing containing radial and axial support means of a rotating shaft member, having provisions for a lubricating film there between, having a front cylindrical and a rear conical bearing for radial and axial journal support respectively, having one thrust bearing to support shaft axial loads, lubricating fluid being directed to bearing surfaces through passages in said housing to orifices contained in said bearings, said orifices being formed by two adjoining members, one or both of which contain slots, said radial support journal's orifices are formed by two annular cylindrical members, one of said annular members has an annular groove, the adjoining annular member has a projection which protrudes into said annular groove, said member with said projection has three or more radial slots forming slotted orifices for directing the lubricating fluid.

7. A hydrostatic fluid bearing system as defined in claim 6 wherein the thrust support bearing includes orifices which are formed by a cylindrical member having three or more axial slots, said cylindrical member having a mating member so as to form slotted inherently compensated orifices for introducing lubricating fluid for axial bearing surfaces and forces.

8. A hydrostatic fluid bearing system according to claim 7 wherein the slotted orifices are comprised of three specific volume sections, the first volume being the inlet section, the second volume being the orifice section, the third volume being the exit section.

9. A hydrostatic fluid bearing system as defined in claim 6 wherein said annular groove defines a first surface and said projection defines a second surface, said first and second surfaces mate with each other and have slightly tapered surfaces so that upon assembly said annular members abut tightly together to form said orifices.

10. A hydrostatic fluid bearing system as defined in claim 6 wherein said slotted orifices define a substantially rectangular cross section.

11. A spindle employing a hydrostatic fluid bearing system comprising a housing containing radial and axial support means for a rotating shaft member, having provisions for a lubricating film there between, having a front and a rear cylindrical bearing for radial journal support, and having a thrust bearing to support shaft axial loads, lubricating fluid being directed to bearing surfaces through passages in said housing to orifices contained in said bearings, said orifices being formed by two annular members, whereby one annular member has an annular groove, the adjoining annular member has a projection which protrudes into said annular groove, said member with said projection has three or more radial slots forming slotted orifices for directing the lubricating fluid.

12. A spindle as defined in claim 11, employing a hydrostatic fluid bearing system wherein the thrust support bearing includes orifices which are formed by a cylindrical member having three or more axial slots, said cylindrical member having a mating member so as to form slotted inherently compensated orifices for introducing lubricating fluid for axial bearing surfaces and forces.

13. A spindle as defined in claim 11, employing a hydrostatic fluid bearing system, wherein the slotted orifices are comprised of three specific volume sections, the first volume being the inlet section, the second volume being the orifice section, the third volume being the exit section.

14. A hydrostatic fluid bearing system as defined in claim 11 wherein said annular groove defines a first surface and said projection defines a second surface, said first and second surfaces mate with each other and have slightly tapered surfaces so that upon assembly said annular members abut tightly together to form said orifices.

15. A hydrostatic fluid bearing system as defined in claim 11 wherein said slotted orifices define a substantially rectangular cross section.

16. A spindle employing a hydrostatic fluid bearing system comprising a housing containing radial and axial support means for a rotating shaft member, having provisions for a lubricating film there between, having a front cylindrical and a near conical bearing for radial and axial journal support respectively, having one thrust bearing to support shaft axial loads, lubricating fluid being directed to bearing surfaces through passages in said housing to orifices contained in said bearings, said orifices being formed by at least two adjoining members, one or both of which contain slots, said radial support journal's orifices are formed by two annular cylindrical members, one of said annular members has an annular groove, the adjoining annular member has a projection which protrudes into said annular groove, said member with said projection has three or more radial slots forming slotted orifices for directing the lubricating fluid.

17. A spindle employing a hydrostatic fluid bearing as defined in claim 16 wherein the thrust support bearing includes orifices which are formed by a cylindrical member having three or more axial slots, said cylindrical member having a mating member so as to form slotted inherently compensated orifices for introducing lubricating fluid for axial bearing surfaces and forces.

18. A spindle employing a hydrostatic fluid bearing as defined in claim 16 wherein the slotted orifices are comprised of three specific volume sections, the first volume being the inlet section, the second volume being the orifice section, the third volume being the exit section.

19. A hydrostatic fluid bearing system as defined in claim 16 wherein said annular groove defines a first surface and said projection defines a second surface, said first and second surfaces mate with each other and have slightly tapered surfaces so that upon assembly said annular members abut tightly together to form said orifices.

20. A hydrostatic fluid bearing system as defined in claim 16 wherein said slotted orifices define a substantially rectangular cross section.

21. A hydrostatic fluid bearing system comprising a housing containing radial and axial support means for a rotating shaft member, having provisions for lubricating film there between, having a front and a rear cylindrical bearing including cylindrical segments for radial journal support, lubricating fluid being directed to bearing surfaces through passages in said housing, to orifices contained in said front and rear cylindrical bearings, said orifices being formed by two adjoining cylindrical segments, one of such cylindrical segments defining an annular groove, the adjoining cylindrical segment having a projection which protrudes into said annular groove, said segment with said projection defining three or more radial slots forming slotted orifices for directing the lubricating fluid, a thrust bearing to support shaft axial loads which includes orifices which are formed by a cylindrical member having three or more axial slots, said cylindrical member having a mating member so as to form slotted inherently compensated orifices for introducing lubricating fluid for axial bearing surfaces and forces, each of said orifices including three specific volume sections, the first volume being the inlet section, the second volume being the orifice section, and the third volume being the exit section, each of said sections defining a substantially rectangular cross section.

* * * * *